United States Patent Office 3,378,516
Patented Apr. 16, 1968

3,378,516
POLYOLEFINS AND PARAFFIN WAXES STABILIZED WITH THIODIALKANOATE POLYESTERS
Clarence E. Tholstrup, Alan Bell, and Charles J. Kibler, all of P.O. Box 511, Kingsport, Tenn. 37662
No Drawing. Continuation of application Ser. No. 309,309, Sept. 16, 1963. This application Nov. 21, 1966, Ser. No. 596,005
4 Claims. (Cl. 260—45.8)

ABSTRACT OF THE DISCLOSURE

Stabilized compositions comprising poly-α-olefins, paraffin waxes and copolymers including at least 40% of an α-olefin which contains a polyester obtained from a thiodialkanoic acid and a diol having a molecular weight in the range of about 500 to about 4000.

This application is a continuation of U.S. application Ser. No. 309,309 (now abandoned), filed Sept. 16, 1963, which in turn was a continuation-in-part of U.S. applications Ser. No. 77,862 (now U.S. Patent No. 3,157,517) and Ser. No. 77,863 (now abandoned), both filed Dec. 23, 1960.

This application is a continuation-in-part of our co-pending applications, Ser. No. 77,862 (now U.S. Patent No. 3,157,517 patented Nov. 17, 1964) and Ser. No. 77,863, filed Dec. 23, 1960 (now abandoned).

This invention relates to stabilized hydrocarbon compositions such as poly-α olefins, paraffin wax and copolymers including at least 40% of an α-olefin which hydrocarbon compositions contain a linear thiodialkanoate polyester as a stabilizer. The invention also covers such hydrocarbon compositions wherein one or more of a phenolic antioxidant stabilizer, a phenolic ultraviolet light stabilizer, and an organic phosphite stabilizer is also present.

Since the above-mentioned parent applications describe in detail the linear thiodialkanoate polyesters which serve as stabilizers in the present application, no description of the preparation of such polyester stabilizers will be necessary herein. For convenience of expression these polyesters are sometimes referred to as "complex polyesters."

Poly-α-olefins such as polyethylene, polypropylene and the like are commonly subjected to elevated temperatures in the course of their processing into useful items of commerce. Such processing methods as rolling, injection molding, extrusion and the like at elevated temperatures usually result in oxidative degradation of the polymer. In addition, many uses of poly-α-olefins, such as in electrical insulation and the like, oftentimes expose the poly-α-olefins to elevated temperatures. To minimize oxidative deterioration in poly-α-olefins, anti-oxidants or stabilizers are oftentimes incorporated therein.

It is an object of this invention to provide new poly-α-olefin compositions having resistance to thermal degradation.

It is also an object of this invention to provide novel polyethylene and polypropylene compositions containing compounds which, when used both separately and together, add stability against deterioration resulting from exposure to elevated temperatures to the polyethylene and polypropylene compositions.

It is another object of this invention to provide new synergistic combinations of stabilizers for poly-α-olefin compositions.

It is still another object of this invention to provide a method of producing stability against oxidative deterioration in poly-α-olefins by the incorporation therein of synergistic combinations of stabilizers.

It is a more particular object of this inventon to provide new hydrocarbon compositions having resistance to thermal and ultraviolet light degradation.

It is also an object of this invention to provide novel hydrocarbon compositions containing polyesters prepared from a thiodialkanoic acid and a diol, which alone or together with other type antioxidants, can be stabilized with ultraviolet light inhibitors for superior weathering properties.

Another object of this invention is to provide new synergistic combinations of stabilizers which can be used in hydrocarbon compositions and for other purposes.

Another object of this invention is to provide novel poly-α-olefin compositions that will have superior weathering and aging properties after being extruded into films, fibers and molded into articles of varying shapes and sizes or cast in various forms or coated as films, dielectrics, coated fabrics, etc.

It is a further object to make similar provisions with respect to other hydrocarbon compositions as already indicated.

Other objects will become apparent elsewhere herein.

According to a preferred embodiment this invention provides a normally solid hydrocarbon composition having improved stability consisting essentially of (1) a hydrocarbon member selected from the group consisting of a paraffin wax, a solid polymer of an α-monoolefin having from 2 to 22 carbon atoms and solid copolymers of an unsaturated hydrocarbon of which at least 40% by weight is composed of at least one α-monoolefin having from 2 to 22 carbon atoms, and (2) from about 0.001% to about 10% by weight of a stabilizer comprising as an essential component a linear thiodialkanoate polyester having an average molecular weight of from about 500 to about 4,000 and having a formula selected from the group consisting of first, second and third formulas as follows:

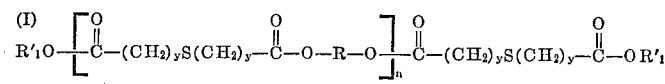

(II)
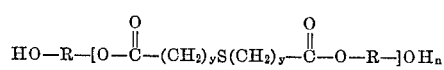

and (III)
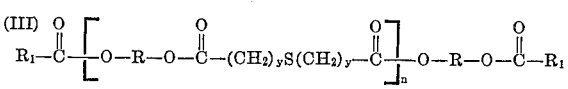

wherein $n$ is an integer of at least 1, $y$ is an integer of from 2 to 3, each $R_1$ is a member selected from the group consisting of a hydrogen atom, an alkyl radical having from 1 to 24 carbon atoms, a cycloalkyl radical having from 4 to 24 carbon atoms, an aryl radical of the benzene series having from 6 to 24 carbon atoms, and an aralkyl radical of the alkylated benzene series containing from 7 to 24 carbon atoms, each $R'_1$ is a member selected from the group consisting of an —ROH radical and $R_1$ members, and each R is a divalent radical containing from 2 to 18 carbon atoms, an arylenedimethylene radical contraining from 8 to 12 carbon atoms, a cycloalkylenedimethylene radical containing from 6 to 18 carbon atoms, a —CH$_2$[O(CH$_2$)$_3$]O—CH$_2$— radical, and a
—CH$_2$[S(CH$_2$)$_z$]$_x$S—CH$_2$— radical, $x$ being an integer of from 1 to 20 and $z$ being an integer of from 2 to 6.

According to another embodiment of this invention there is provided a hydrocarbon composition containing said complex polyester stabilizer component which composition contains at least about 0.001% by weight of a phenolic antioxidant stabilizer for said poly-α-olefin which is present in an amount whereby the oxidative degradation is less than can be attributed to the sum of the stabilizing effects of all stabilizer components present, the weight ratio of said polyester stabilizer component to said phenolic antioxidant stabilizer component being from about 1/20 to about 20/1.

A preferred class of such hydrocarbon compositions are those wherein said phenolic antioxidant stabilizer is an aromatic compound having at least one benzene ring to which is attached a hydroxy radical and any other constituents of said aromatic compound are selected from the group consisting of hydrocarbon radicals having 1 to 24 carbon atoms, alkylcarbonyl radicals having from 1 to 24 carbon atoms, alkoxy radicals having from 1 to 24 carbon atoms, carboxy radicals, carbalkoxy radicals having from 2 to 24 carbon atoms, alkylenedioxy radicals having from 1 to 12 carbon atoms, oxy radicals, thio radicals and amino radicals.

According to another embodiment of this invention there is provided a hydrocarbon composition containing said complex polyester stabilizer component which composition contains at least about 0.001% by weight of a phenolic ultraviolet light stabilizer for inhibiting degradation from ultraviolet light, which stabilizer is present in an amount whereby degradation due to exposure to ultraviolet light is less than can be attributed to the sum of the stabilizing effects of all stabilizer components present, the weight ratio of said polyester stabilizer component to said phenolic ultraviolet light stabilizer component being from about 1/20 to about 20/1.

A preferred class of such hydrocarbon compositions are those wherein said phenolic ultraviolet light stabilizer is an aromatic compound selected from the group consisting of phenylsalicylates having from 13 to 60 carbon atoms and hydroxybenzophenones having from 13 to 60 carbon atoms.

According to another embodiment of this invention there is provided a hydrocarbon composition containing said complex polyester stabilizer component which composition contains at least about 0.001% by weight of an organic phosphite stabilizer for inhibiting thermal degradation and discoloration, which stabilizer is present in an amount whereby degradation due to exposure to elevated temperatures is less than can be attributed to the sum of the stabilizing effects of all stabilizer components present, the weight ratio of said polyester stabilizer component to said phosphite stabilizer component being from about 1/20 to about 20/1.

A preferred class of such hydrocarbon compositions are those wherein said phosphite stabilizer is an organic phosphorus compound having from 3 to 72 carbon atoms selected from the group consisting of tris (alkylated phenyl) phosphites and dialkyl pentaerythritol diphosphites.

According to an especially preferred embodiment of this invention there is provided a hydrocarbon composition which contains said complex polyester component along with two of the following stabilizer groups: (1) phenolic antioxidant stabilizers, (2) phenolic ultraviolet light stabilizers and (3) organic phosphite stabilizers. Especially outstanding results can be achieved when all three of these stabilizer groups are employed simultaneously.

According to still further embodiments of this invention there are provided novel stabilizer compositions per se, i.e. said complex polyester in combination with one, two or three of the three groups of stabilizers just named above. These stabilizer compositions are useful as additives to be incorporated in hydrocarbon compositions which are normally subject to deterioration due to the effects of oxygen, heat, ultraviolet light, weathering, etc. Such stabilizer compositions can be advantageously prepared having suitable ratios of constituents as indicated above and are ready for addition to the substrates in amounts determined by the ultimate degree of stability desired in order to meet particular circumstances of anticipated exposure to degradative conditions. Although primarily intended for use as stabilizer compositions for admixture with hydrocarbon materials, they can also be used for other stabilizing purposes such as indicated above including utility in fats, oils, insecticides, fuels, polyesters, polyamides, polyurethanes, polycarbonates, polyvinyl resins, other synthetic resins, and various organic compositions in general.

Among the various discoveries made by the inventors, it has been found surprisingly that such a complex polyester when incorporated in a poly-α-olefin composition imparts to said composition a high degree of resistance to oxidative deterioration and that even more surprisingly a synergistic effect is obtained when the complex polyester is incorporated therein together with a phenolic antioxidant. The result is particularly unexpected since polyesters of a similar formula to those in the above group where $y$ is less than 2 or greater than 3 will not impart any such antioxidant effect to poly-α-olefin compositions.

By phenolic antioxidant we mean any organic phenol which exhibits antioxidant properties when compatible with and incorporated in a normally oxidizable organic material, for example, hydrocarbons such as paraffin wax, petroleum oils including gasoline and other motor fuels, polypropylene, polyethylene and other normally solid polymers of α-monoolefins, petroleum derivatives such as lubricating oils, transformer oils and the like, polyesters including linear polyesters and alkyd resins, synthetic rubber compositions, natural rubber compositions, insecticide compositions, medicinal preparations, and similar compositions.

Thus, a wide variety of phenolic antioxidants can be effectively utilized in combination with the above-mentioned complex polyesters. Illustrative of such phenolic antioxidants are certain alkylidenebisphenols, such as those described in the copending Tholstrup application, Ser. No. 4,189, filed Jan. 25, 1960, now U.S. Patent No. 3,033,814, granted May 8, 1962.

A particularly effective group of alkylidenebisphenols has the following formula:

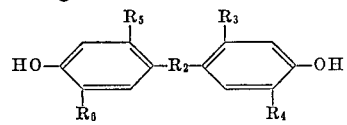

wherein $R_2$ is an alkylene or alkylidene radical having 1 to 12 carbon atoms, and wherein $R_3$, $R_4$, $R_5$ and $R_6$ are hydrocarbon radicals having 1 to 12 carbon atoms including benzyl radicals, cyclohexyl radicals, 1-alkylbenzyl radicals, 1-alkylcyclohexyl radicals, or more usually alkyl radicals having 1 to 12 and preferably 1 to 4 carbon atoms. $R_4$ and $R_6$ are desirably tertiary alkyl radicals having 4 to 8 carbon atoms.

Another group of phenolic antioxidants also described in said copending Tholstrup application Ser. No. 4,189, consists of phenyl salicylates which have the formula:

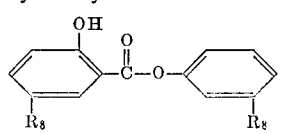

wherein $R_7$ and $R_8$ are hydrogen atoms or hydrocarbon radicals having 1 to 15 carbon atoms including benzyl radicals, cyclohexyl radicals, 1-alkylbenzyl radicals, 1-alkylcyclohexyl radicals, or more usually alkyl radicals having 1 to 15 carbon atoms.

Suitable substituted phenyl salicylates such as those described in the copending application by Addelburg, Lappin and Rouse, Ser. No. 775,336, filed Nov. 21, 1958, now U.S. Patent No. 3,043,797 granted July 10, 1962, can also be utilized.

Another variety of phenolic antioxidants which are suitable for use in this invention are alkylenebisphenols and alkylidenebisphenols such as those described in copending application Ser. No. 850,985 by Joyner et al., filed on Nov. 5, 1959, and having the general formulas:

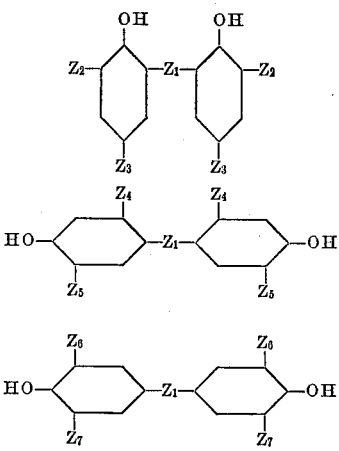

and

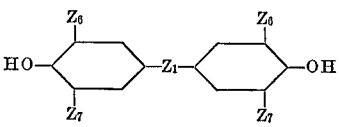

In the above bisphenol formulas: $Z_1$ is either an alkylidene radical or an alkylene radical usually having 1 to 12 carbon atoms and more generally 1 to 4 carbon atoms and typically having the formulas

or $-(CH_2)_n-$ wherein Z is a hydrogen atom or an alkyl radical and $n$ is an integer of at least 1; and $Z_2$, $Z_3$, $Z_4$, $Z_5$, $Z_6$ and $Z_7$ are hydrogen atoms, alkyl radicals usually having 1 to 12 carbon atoms and preferably 1 to 4 carbon atoms, 1-alkylcyclohexyl radicals wherein the alkyl moiety usually has 1 to 4 carbon atoms, 1-alkylcyclohexyl radicals wherein the alkyl moiety usually has 1 to 4 carbon atoms and preferably is methyl, or 1-alkylbenzyl wherein the alkyl moiety usually has 1 to 4 carbon atoms and preferably is methyl. At least one of $Z_2$ and $Z_3$, at least one of $Z_4$ and $Z_5$, and at least one of $Z_6$ and $Z_7$ are other than hydrogen atoms in the preceding bisphenol formulas. Typical of these bisphenols are 2,2'-alkylene or alkylidene bis(4 and/or 6-substituted phenols) such as 2,2'-methylenebis(4-methyl-6-tert.-octylphenol),
2,2'-methylenebis-(4-methyl-6-tert.-dodecylphenol),
2,2'-methylenebis(6-tert.-butyl-phenol),
2,2'-methylenebis(4-tert.-dodecyl-6-methylphenol),
2,2'-methylenebis(4-tert.-dodecylphenol),
2,2'-methylenebis(4-methyl-6-amylphenol),
2,2'-methylenebis[4-methyl-6-(1-methylbenzyl)phenol],
2,2'-methylenebis[4-methyl-6-(1-methylcyclohexyl) phenol],
2,2'-ethylidenebis(4,6-diamylphenol),
2,2'-ethylidenebis(4-tert.-butyl-6-tert.-octylphenol),
2,2'-isopropylidenebis(4-tert.-butyl-6-n-dodecylphenol),
2,2'-isopropylidenebis(4,6-di-n-octylphenol),
2,2'-n-butylidenebis(4-methylphenol),
2,2'-n-butylidenebis[4-methyl-6-(1-methylbenzyl) phenol],
2,2'-isobutylidenebis[6-(1-n-butylcyclohexyl)phenol],
2,2'-n-decamethylenebis(4-methylphenol),
2,2'-n-dodecamethylenebis(4-tert.-butyl-6-methylphenol), and related 2,2'-alkylene or alkylidenebis(4 and/or 6-substituted phenols), 4,4'-alkylidene or alkylenebis (3 and/or 6-substituted phenols) such as 4,4'-methylenebis(3-methyl-6-tert.-butylphenol),
4,4'-methylene-bis(3-ethyl-6-tert.-octylphenol),
4,4'-methylenebis(3-methyl-6-tert.-dodecylphenol),
4,4'-methylenebis(6-tert.-butylphenol),
4,4'-methylenebis(3-tert.-dodecyl-6-methylphenol),
4,4'-methylenebis(3,6-tert.-dodecylphenol),
4,4'-methylenebis(3-methylphenol),
4,4'-methylenebis[3-methyl-6-(1-ethylbenzyl)phenol],
4,4'-methylenebis-[3-methyl-6-(1-iso-butylcyclohexyl) phenol],
4,4'-methylenebis[3-methyl-6-(1-methylbenzyl)-phenol],
4,4'-ethylidenebis(3,6-diamyl-phenol),
4,4'-ethylidenebis(3-tert.-butyl-6-tert.-octylphenol),
4,4'-isopropylidenebis(3-tert.-butyl-6-n-dodecylphenol),
4,4'-isopropylidenebis(3,6-di-n-octylphenol),
4,4'-n-butylidenebis(3-methyl-phenol),
4,4'-n-butylidenebis(3-methyl-6-tert.-butylphenol),
4,4'-n-butylidenebis[3-methyl-6-(1-methylcyclohexyl) phenol],
4,4'-isobutylidenebis(3,6-di-n-octylphenol),
4,4'-n-butylidenebis[3-methyl-6-(1-tert.-butylbenzyl) phenol],
4,4'-isobutylidenebis[6-(1-n-butylcyclohexyl)-phenol],
4,4'-n-decamethylenebis(3-methylphenol),
4,4'-n-dodecamethylenebis(3-tert.-butyl-6-methylphenol), and related 4,4'-alkylene or alkylidenebis (3 and/or 6-substituted phenols), 4,4'-alkylidene or alkylene bis (2 and/or 6-substituted phenols) such as 4,4'-methylenebis(2-methyl-6-tert.-butylphenol),
4,4'-methylene-bis(2-ethyl-6-tert.-octylphenol),
4,4'-methylenebis(2-methyl-6-tert.-dodecylphenol),
4,4'-methylenebis(6-methylphenol),
4,4'-methylenebis(2-tert.-dodecyl-6-methylphenol),
4,4'-methylenebis(2,6-di-tert.-dodecylphenol),
4,4'-methylenebis(2-methylphenol),
4,4'-methylenebis[2-methyl-6-(1-ethylbenzyl)phenol],
4,4'-methylenebis[2-methyl-6-(1-iso-butylcyclohexyl) phenol],
4,4'-methylene-bis[2-methyl-6-(1-methylbenzyl)phenol],
4,4'-ethylidenebis(2,6-di-tert.-butylphenol),
4,4'-isopropylidenebis(2-tert.-butyl-6-n-dodecylphenol),
4,4'-isopropylidenebis(2,6-di-n-octylphenol),
4,4'-n-butylidenebis(2-methylphenol),
4,4'-n-butylidenebis(2-methyl-6-tert.-butylphenol),
4,4'-n-butylidenebis[2-methyl-6-(1-methyl-cyclohexyl) phenol],
4,4'-n-butylidenebis[2-methyl-6-(tert.-butyl-benzyl) phenol],
4,4'-isobutylidenebis(2,6-di-n-octylphenol),
4,4'-isobutylidenebis[6-(1-n-butylcyclohexyl)phenol],
4,4'-decamethylenebis(2-methylphenol),
4,4'-n-dodecamethylenebis(2-tert.-butyl-6-methylphenol), and related 4,4'-alkylenebis (2 and/or 6-substituted phenols).

Among other representative phenolic antioxidants which may be used are single-ring phenols and substituted phenols such as those described in copending Tholstrup application U.S. Ser. No. 54, filed Jan. 4, 1960, having the formulas:

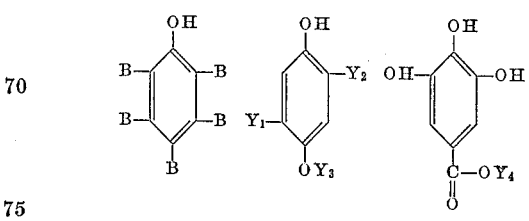

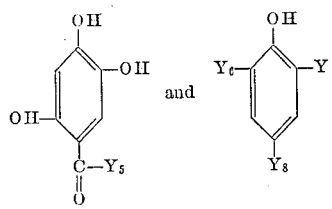

wherein B can be H or OH, but OH in no more than two of the B positions, $Y_3$, $Y_4$ and $Y_5$ are alkyl radicals desirably having 1 to 18 carbon atoms and preferably 1 to 12 carbon atoms; $Y_1$, $Y_2$, $Y_6$, $Y_7$ and $Y_8$ are alkyl radicals desirably having 1 to 18 carbon atoms and preferably 1 to 12 carbon atoms, hydrogen atoms, or cyclic hydro-carbon radicals desirably having 6 carbon atoms in the cyclic nucleus and preferably 1-alkylcyclohexyl radicals or 1-alkylbenzyl radicals with the alkyl radical having desirably 1 to 18 and preferably 1 to 12 carbon atoms, and wherein at least one of $Y_1$ and $Y_2$ is other than a hydrogen atom and at least two of $Y_6$, $Y_7$ and $Y_8$ are other than hydrogen atoms. The substituent $Y_2$ and at least one of $Y_6$ and $Y_7$ is preferably a tertiary alkyl radical having 4 to 8 carbon atoms, a 1-methylbenzyl radical or a 1-methylcyclohexyl radical.

Typical of these substituted phenols are 2-tert.-butyl-4-methoxyphenol, 3 - tert.-butyl - 4 - methoxyphenol, 3-tert.-octyl - 4 - methoxyphenol, 2-methyl - 4 - methoxyphenol, 2-stearyl - 4 - n-butoxyphenol, 3-tert.-butyl-4-stearyloxyphenol, 3-tert.-octyl - 4 - methoxy-phenol, 3-lavryl - 4 - ethoxyphenyl, 2,5 - di-tert.-butyl - 4 - methoxyphenol, 2-methyl - 4 - methoxyphenol, 2-(1-methylcyclohexyl) - 4 - methoxyphenol, 2-tert.-butyl - 4 - dodecyloxyphenol, 2-(1-methylbenzyl) - 4 - methoxy-phenol, 2-tert.-octyl - 4 - methoxyphenol, methyl gallate, n-propyl gallate, n-butyl gallate, lauryl gallate, myristyl gallate, stearyl gallate, 2,4,5 - trihydroxyacetophenone, 2,4,5-trihydroxy - n - butyro-phenone, 2,4,5 - trihydroxystearophenone, 2,6- di-tert.-butyl - 4 - methylphenol, 2,6-di-tert.-octyl - 4 - methylphenol, 2,6-di-tert.-butyl - 4 - stearylphenol, 2-methyl - 4 - methyl - 6 - tert.-butylphenol, 2,6-distearyl - 4 - methylphenol, 2,6-dilauryl-4-methylphenol, 2,6 - di(1-methylbenzyl) - 4 - methylphenol, 2,6-di(1-methylcyclohexyl) 4 - methyl-phenol, 2-(1-methylcyclohexyl) - 4 - methylphenol, 2-(1-methylbenzyl)-4-methylphenol, and related substituted phenols.

Other phenolic antioxidants which can be used in our invention are the 4,4-alkylenedioxbis(alkylated phenols), such as those described in copending application U.S. Ser. No. 702,814 by Bell, Knowles, and Tholstrup, filed on Dec. 16, 1957, now U.S. Patent No. 2,967,774 granted Jan. 10, 1961, which have the formula:

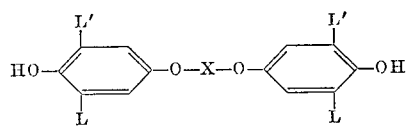

wherein each of L and L' represents a member selected from the group consisting of a hydrogen atom and an alkyl-organic radical containing from 1 to 12 carbon atoms, said alkyl-organic radical encompassing members selected from the group consisting of alkyl, cycloalkyl, alkenyl, and aralkyl radicals, and X represents an alkylene radical containing from 1 to 10 carbon atoms. L' above can be the same as L or it can be a different alkyl-organic radical or a hydrogen atom. Each of the four substituents represented by L and L' can be different although it is generally advantageous if the two L substituents are identical and the two L' substituents be the same as the two L substituents or that they represent hydrogen atoms.

Equally as suitable for the purposes of this invention as the phenolic antioxidants already recited are certain thiobisphenols having the following general formulas:

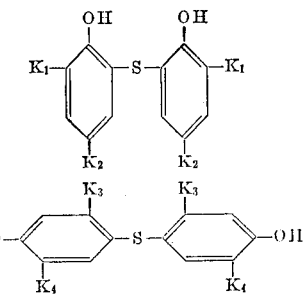

and

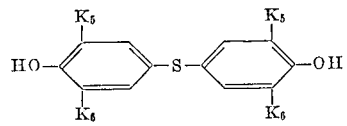

These thiobisphenols are more particularly described in copending Tholstrup application, U.S. Ser. No. 860,667, filed Dec. 21, 1959. In the above thiobisphenol formulas: $K_1$, $K_2$, $K_3$, $K_4$, $K_5$ and $K_6$ can be hydrogen atoms, alkyl radicals, or cyclic hydrocarbon radicals, and at least one of such radicals or substituents on each phenol nucleus is preferably other than a hydrogen atom. The alkyl radicals desirably have 1 to 18 carbon atoms, and preferably 1 to 12 carbon atoms. $K_1$, $K_4$ and $K_5$ are preferably tertiary alkyl radicals having 4 to 8 carbon atoms such as tertiary butyl radicals and tertiary octyl radicals, or 1-methylcyclohexyl radicals. The cyclic hydrocarbon radicals desirably have 6-carbon cyclic nuclei such as cyclohexyl and benzyl, and preferably are such radicals as 1-methylcyclohexyl and 1-methylbenzyl. Especially useful thiobisphenols in the invention are 2,2'-thiobis(4-methyl-6-tert.-butyl-phenol),
4,4'-thiobis(3-methyl-6-tert.-butylphenol),
4,4'-thiobis [3-methyl-6(1-methylcyclohexyl) phenol], and
4,4'-thiobis(2-methyl-6-tert.-butylphenol).

Other typical thiobisphenols which can be used include 2,2'-thiobis(4,6-dimethylphenol),
2,2'-thiobis(4,6-di-tert.-butylphenol),
2,2'-thiobis(4-ethyl-6-tert.-butylphenol),
2,2'-thiobis(4-n-propyl-6-amylphenol),
2,2'-thiobis(4-methyl-6-n-octylphenol),
2,2'-thiobis(4-amyl-6-tert.-octylphenol),
2,2'-thiobis(4-methyl-6-n-decylphenol),
2,2'-thiobis(4-methyl-6-lauryl-phenol),
2,2'-thiobis[4-methyl-6-(1-methylcyclohexyl) phenol],
2,2'-thiobis(4-methylphenol),
2,2'-thiobis(6-tert.-butylphenol),
2,2'-thiobis(4,6-dilaurylphenol),
2,2'-thiobis(4,6-distearylphenol),
4,4'-thiobis(3,6-dimethylphenol),
4,4'-thiobis(3,6-di-tert.-butyl-phenol),
4,4'-thiobis(3-ethyl-6-tert.-butylphenol),
4,4'-thiobis(3-n-propyl-6-amylphenol),
4,4'-thiobis(3-methyl-6-n-octylphenol),
4,4'-thiobis(3-amyl-6-tert.-octylphenol),
4,4'-thiobis(3-methyl-6-n-decylphenol),
4,4'-thiobis(3-methyl-6-laurylphenol),
4,4'-thiobis(3,6-dilaurylphenol),
4,4'-thiobis(3,6-distearylphenol),
4,4'-thiobis[3-methyl-6-(1-methylcyclohexyl)phenol],
4,4'-thiobis[3-methyl-6-(1-methylbenzyl)phenol],
4,4'-thiobis(2-tert.-butylphenol),
4,4'-thiobis[2-methyl-6-(1-methylcyclohexyl)phenol], 4,4'-thiobis-[2-methyl-6-(1-methylbenzyl)phenol],
4,4'-thiobis(2-methyl-6-tert.-butylphenol),
4,4'-thiobis(2-methyl-6-laurylphenol),
4,4'-thiobis-(2,6-distearylphenol), and related thiobisphenols.

In addition to monomeric phenols, a wide variety of polymeric phenols and polyphenols come within the scope of the phenolic antioxidants defined above and can be effectively utilized in combination with the complex polyesters referred to hereinabove. Illustrative of such polymeric phenols are those described in copending Tholstrup application, U.S. Ser. No. 5,377, filed Jan. 29, 1960, having the general formula:

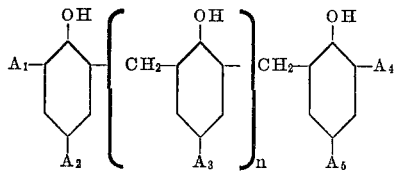

wherein $A_1$, $A_2$, $A_3$, $A_4$ and $A_5$ are alkyl radicals usually having 1 to 12 carbon atoms and preferably 1 to 4 carbon atoms, and $n$ is an integer of 1 to 4 and preferably 1 to 2, $A_1$ and $A_4$ are preferably tertiary alkyl radicals such as tertiary butyl radicals. Other suitable substituents for $A_1$, $A_2$, $A_3$, $A_4$ and $A_5$ include methyl, ethyl, isopropyl, n-butyl, amyl, octyl, decyl, lauryl, stearyl, and related alkyl radicals. Typical of such polymeric phenols and polyphenols are 4-methyl-$\alpha,\alpha'$-bis(3-tert.-butyl-5-methyl-2-hydroxy-phenol)-2,6-xylenol and $\alpha^2,\alpha^{2'}$-methylenebis(2 - hydroxy - 5 - methyl - m - phenylene)bis(6-tert.-butyl-2,4-xylenol). Such compounds can be prepared by the method described in Angewandte Chemie, vol. 70, pp. 390–8, July 7, 1958.

Other phenolic antioxidants which can be used effectively in this invention are a wide variety of hydroxyl-containing amines as illustrated by those having the formulas:

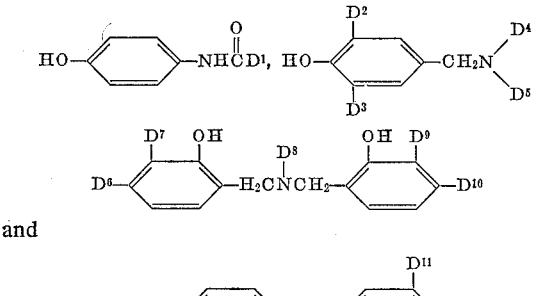

and

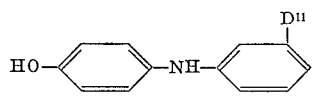

wherein $D^1$, $D^2$, $D^3$, $D^4$, $D^5$, $D^6$, $D^7$, $D^8$, $D^9$, and $D^{10}$ are alkyl radicals having 1 to 18 carbon atoms, and preferably 1 to 12 carbon atoms; and wherein $D^{11}$ is an alkyl radical or an alkoxy radical, both having 1 to 18 carbon atoms, and preferably 1 to 12 carbon atoms.

Typical of these hydroxyl-containing amines are 4-hydroxy-4'-methoxydiphenylamine,
4-hydroxy-4'-isobutoxydiphenylamine,
4-hydroxy-4'-n-octyldiphenylamine,
3-tert.-butyl-4'-hydroxydiphenylamine,
4-hydroxy-4'-lauryldiphenylamine,
2-tert.-butyl-4'-hydroxy-diphenylamine,
4-hydroxy-4'-stearyldiphenylamine,
3-stearyl-4'-hydroxydiphenylamine,
2,6-tert.-butyl-p-dimethylaminomethylphenol,
2,6-dimethyl-p-distearylaminomethylphenol,
2,6-di-tert.-octyl-p-dilaurylaminomethylphenol,
2,6-distearyl-p-dimethylaminomethylphenol,
2,6-dilauryl-p-diethylaminomethylphenol,
N,N'-bis(2-hydroxy-3-tert.-butyl-5-methylbenzyl)methylamine,
N,N'-bis(2-hydroxy-3-tert.-butyl-5-laurylbenzyl)laurylamine,
N,N'-bis(2-hydroxy-3-lauryl-5-stearylbenzyl)-n-butylamine,
N,N'-bis(2-hydroxy-3-stearyl-5-methylbenzyl)methylamine,
N,N'-bis(2-hydroxy-3-methyl-5-tert.-butylbenzyl)stearylamine,
N-acetyl-p-aminophenyl,
N-n-butyryl-p-aminophenol,
N-caprylyl-p-aminophenol,
N-pelargonyl-p-aminophenol,
N-myristoyl-p-aminophenol,
N-lauryl-p-aminophenol,
N-palmitoyl-p-aminophenol,
N-n-nonadecanoyl-p-aminophenol, and related hydroxyl-containing amines.

Thus, the group of phenolic antioxidants which can be used in this invention in synergistic combination with certain complex polyesters to be more particularly described hereinbelow includes alkylene bisphenols, alkylidenebisphenols, single-ring phenols and substituted single-ring phenols, phenyl salicylates and substituted phenyl salicylates, thiobisphenols, 4,4'-alkylenedioxybis(alkylated phenols) and polymeric phenols and polyphenols, and hydroxyl-containing amines, and the like, the most preferable compounds from this group being those enumerated hereinabove.

The phenyl salicylates and substituted phenyl salicylates in the preceding group are primarily considered to be ultraviolet light stabilizers.

The described complex polyesters either alone or synergistically with phenolic antioxidants such as those enumerated hereinabove can be used to stabilize a wide variety of solid poly-$\alpha$-olefin compositions against deterioration resulting from exposure to elevated temperatures. Any of the normally solid polymers of $\alpha$-monoolefinic aliphatic hydrocarbons containing 2 to 22 carbon atoms can be stabilized in accordance with the invention. The subject stabilizer combinations are preferably used in polyethylene and polypropylene, although such poly-$\alpha$-olefins as poly(3-methyl-butene-1), poly(4-methylpentene-1), polypentene-1), poly(3,3 - dimethylbutene-1), poly(4,4 - dimethylbutene-1), poly(octene-1), poly-(decene-1) and the like can also be stabilized with the subject stabilizer combinations. Both are so-called "low density" and "high density" or high crystallinity poly-$\alpha$-olefin compositions can be stabilized in accordance with the invention. Reference is made to Fawcett et al. U.S. Patent No. 2,153,-553, granted Apr. 11, 1939, and to copending application Coover et al., U.S. Ser. No. 724,904, filed Mar. 31, 1958, now abandoned, with regard to the preparation of various poly-$\alpha$-olefin compositions that can be stabilized against thermal degradation in accordance with the invention. The additive stabilizer combinations of the invention are especially useful for stabilizing the solid resinous poly-$\alpha$-olefins having average molecular weights of at least 15,000 and more usually at least 20,000, although the stabilizer combinations of the invention can also be utilized to stabilize the so-called poly-$\alpha$-olefin waxes having lower average molecular weights of usually 3,000 to 12,000. Paraffin wax is also similar to such waxes and can be stabilized as described herein.

The amounts of polyester and phenolic antioxidant employed in poly-$\alpha$-olefin compositions in accordance with the invention can be widely varied, the stabilizing amounts usually varying with the particular use to which the poly-$\alpha$-olefin compositions are to be put. Concentrations of at least about .001% of each stabilizer component are suitable, although about .001% to 5% for each component are generally used with about .01% to 3% of the polyester and about .01% to 1% of the phenolic antioxidants, when the latter is used to produce the synergistic effect, being preferred, the concentration being based on the weight of the poly-$\alpha$-olefin. When using a combination of the polyester and a phenolic antioxidant, we generally utilize the combination at a weight ratio of the complex polyester to the phenolic antioxidant in the range of 1/20 to 20/1 and preferably 1/5 to 5/1.

The stabilizers of the invention can be incorporated or blended into poly-α-olefin compositions by the conventional methods utilized for blending such materials into resins or plastics. Typical of such methods that can be suitably employed include milling on heated rolls, deposition from solvents, and dry blending. These stabilizers can be incorporated separately or together into the poly-α-olefin compositions.

The complex polyesters, when used alone or in synergistic combination with phenolic antioxidants, increase the stability of poly-α-olefin compositions, especially the stability against oxidative deterioration resulting from exposure to elevated temperatures. In addition, poly-α-olefin compositions containing these stabilizers or stabilizer combinations have enhanced stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses. Poly-α-olefins stabilized as described can be cast, extruded, rolled or molded into sheets, rods, tubes, pipes, filaments and other shaped articles, including the widely used films of the polymers about .5 to 100 mils in thickness. The present compositions can be used for coating paper, wire, metal foil, glass fiber fabrics, synthetic and natural textiles or fabrics, and other such materials.

The stabilizer combinations of complex polyesters having the formulas given above and phenolic antioxidants are synergistic combinations, i.e., unexpectedly the stabilizing effect of such combinations in poly-α-olefins is substantially greater than the additive effect of the individual stabilizers of the combination.

What has been said and described in great detail hereinabove regarding the use of stabilizer combinations of the complex esters and phenolic antioxidants is also applicable to the other stabilizer combinations encompassed by this invention.

It should be noted that some of these phenolic antioxidants are also phenolic ultraviolet light stabilizers, viz. phenylsalicylates having 13 to 60 carbon atoms. For the purposes of defining this invention these phenylsalicylates along with the hydroxybenzophenones having 13 to 60 carbon atoms are considered as being primarily ultraviolet light stabilizers.

The organic phosphite stabilizers are preferably those wherein the organic radicals are hydrocarbon radicals such as tris (alkylated-phenyl) phosphites, dialkyl pentaerythritol diphosphites and related organic phosphites including polyphosphites which are known to be useful as stabilizers as described in various publications and patents including U.S. 2,234,379; U.S. 2,834,798; U.S. 2,650,213; U.S. 2,839,563; U.S. 2,841,606; U.S. 2,841,608; U.S. 2,847,443; U.S. 2,985,617; U.S. 3,039,993; U.S. 3,096,345, etc. Such organic phosphite and polyphosphite stabilizers include alkyl cycloalkyl, aryl, aralkyl, alkaryl, and other hydrocarbon radicals and include all types of related compounds. To coin a generic expression they can be called hydrocarbon substituted phosphites. However, the presence of halogen atoms on the hydrocarbon radicals is also contemplated and is to be considered within the scope of this aspect of the invention.

Compositions illustrating the effectiveness of the complex polyester stabilizers of this invention as antioxidants are set forth in the tables below which illustrate the improved oxidative resistance of poly-α-olefins in which our polyesters and synergistic combinations thereof are incorporated. The oven storage life is the time required for initial peroxide formation in a sample of the polymer. To determine peroxide formation in the oven-exposed samples, each 0.25 g. sample in question is dissolved or suspended in 20 ml. of carbon tetrachloride and allowed to digest for 25 minutes. To this is added 20 ml. of a mixture consisting of 60% glacial acetic acid and 40% chloroform, and then 1.0 ml. of a saturated aqueous solution of potassium iodide. The resulting mixture is then back-titrated with 0.002 N sodium thiosulfate. The peroxide concentration, P, in milliequivalents per kilogram of polymer is given by the expression, $P=8S$, where $S$ is the number of milliliters of 0.002 N sodium thiosulfate used. Polypropylene A in the following examples is a plastic grade solid polypropylene having an average molecular weight greater than 16,000, a density of about 0.91, and an inherent viscosity of about 1.65 as determined in tetralin at 145° C. Polypropylene B is a plastic grade solid polypropylene having an average molecular weight greater than 16,000, a density of about 0.91, and an inherent viscosity of about 1.48 as determined in tetralin at 145° C.

In various tables presented below, the name of the polyester has been replaced with the example number from the above-mentioned Ser. No. 77,862. The names of these polyesters and their molecular weights are as follows:

Example 1.—Polyester of 3,3′-thiodipropionic acid and neopentyl glycol, molecular weight 669

Example 2.—Polyester of 3,3′-thiodipropionic acid and neopentyl glycol, molecular weight 1,106

Example 3.—Polyester of 3,3′-thiodipropionic acid and neopentyl glycol, molecular weight 1,445

Example 4.—Polyester of 3,3′-thiodipropionic acid and ethylene glycol, molecular weight 674

Example 5.—Polyester of 3,3′ thiodipropionic acid and 1,5-pentanediol, molecular weight 674

Example 6.—Polyester of 4,4′-thiodibutyric acid and ethylene glycol, molecular weight 670

Example 7.—Polyster of 4,4′-thiodibutyric acid and ethylene glycol, molecular weight 1,200

Example 8.—Polyester of thiodipivalic acid and neopentyl glycol, molecular weight 811

Example 9.—Polyester of 3,3′-thiodipropionic acid and 1,4-cyclohexanedimethanol, molecular weight 767

Example 10.—Polyester of 3,3′-thiodipropionic acid and diethylene glycol, molecular weight 893

Example 11.—Polyester of 3,3′-thiodipropionic acid and β,b′-thiodiethanol, molecular weight 773

Example 12.—Polyester of 3,3′-thiodipropionic acid and ethylene glycol, molecular weight 1,441 (not terminated)

It should be noted that Example 8 relates to a polyester used for comparative purposes and does not illustrate this invention.

Stabilization of polypropylene with representative 4,4′-thiodibutyric polyesters and polyester-phenolic antioxidant synergistic combinations Several samples were prepared by dry blending representative complex polyesters of 4,4′-thiodibutyric acid both alone and together with various illustrative phenolic antioxidants in about 20-g. amounts of powdered polypropylene. The samples were compression molded into 1/16-inch-thick plates and the resulting molded plates evaluated with respect to stability by the oven storage test already described. The results of this evaluation are given in Table I below. It can readily be seen that the complex polyesters have a substantial stability effect even when used by themselves.

TABLE I

Additives in polypropylene B:   160° C. oven life, hours
Control (polypropylene B) _____ 0.2
0.1% polyester of Example 6 _____ 1
0.3% polyester of Example 6 _____ 3
0.05% 4,4′-butylidenebis(6-t-butyl-m-cresol) __ 3
0.05% 4,4′-butylidenebis(6-t-butyl-m-cresol)
  +0.1% polyester of Example 6 _____ 90

Additives in polypropylene: 160° C. oven life, hours
0.1% 4,4'-butylidenebis(6-t-butyl-m-cresol)
 +0.1% polyester of Example 6 _____ 200
0.1% 2,6-di-t-butyl-p-cresol _____ 1
0.1% 2,6-di-t-butyl-p-cresol +0.1% polyester
 of Example 6 _____ 6
0.1% propyl gallate _____ 5
0.1% propyl gallate +0.1% polyester of
 Example 6 _____ 23
0.05% 2,4,5-trihydroxybutyrophenone _____ 4
0.05% 2,4,5-trihydroxybutyrophenone +0.1%
 polyester of Example 6 _____ 16
0.05% 2-t-butyl-4-(2,3-epoxypropyloxy)phenol 6
0.05% 2-t-butyl-4-(2,3-epoxypropyloxy)phenol
 +0.1% polyester of Example 6 _____ 80
0.05% 2,6-bis(2'-hydroxy-3'-t-butyl-5'-methylbenzyl)p-cresol _____ 80
0.05% 2,6-bis(2'-hydroxy-3'-t-butyl-5'-methylbenzyl)p-cresol +0.1% polyester of Example 6 _____ 210
0.05% 4,4'-thiobis(6-t-butyl-m-cresol) _____ 40
0.05% 4,4'-thiobis(6-t-butyl-m-cresol) +0.1%
 polyester of Example 6 _____ 200
0.1% 4,4'-thiobis(6-t-butyl-o-cresol) _____ 70
0.1% 4,4'-thiobis(6-t-butyl-o-cresol) +0.1%
 polyester of Example 6 _____ 250
0.05% 2,2'-methylenebis 6-(1-methylhexyl)-p-cresol _____ 7
0.05% 2,2'-methylenebis 6-(1-methylhexyl)-p-cresol +0.1% polyester of Example 6 _____ 120
0.05% 2,2'-methylenebis(6-t-butyl-p-cresol) __ 15
0.05% 2,2'-methylenebis(6-t-butyl-p-cresol) —
 0.1% polyester of Example 6 _____ 100
0.1% N-(4-hydroxyphenyl)morpholine _____ 3
0.1% N-(4-hydroxyphenyl)morpholine +0.1%
 polyester of Example 6 _____ 110

Stabilization of polypropylene with representative 3,3'-thiodipropionic polyesters and polyester-phenolic antioxidant synergistic combinations Several samples of powdered polypropylene were mixed with various representative antioxidants and complex polyesters of 3,3'-thiodipropionic acid, compression molded into plates 1/16 inch in thickness, and the resulting molded samples evaluated with respect to stability by the oven storage test described above. The results of the stability evaluations are summarized by the data set out in Tables II and IIA below. Samples of the individual components of the various stabilizer combinations in the polypropylene, as well as the polypropylene with no additive, were included in the stability tests for comparative purposes. The concentrations of additives in the following tables are based on the weight of polypropylene. Santowhite Powder is 4,4'-butylidenebis(6-tert.-butyl-m-cresol).

TABLE II

Additives in polypropylene A: 160° C. oven life, hours
Control A (polypropylene A) _____ 0.2
0.05% polyester of Example 1 _____ 1.5
0.10% polyester of Example 1 _____ 2
0.05% polyester of Example 3 _____ 1
0.05% Santowhite Powder _____ 3
0.05% Santowhite Powder +0.05% polyester
 of Example 1 _____ 100
0.05% Santowhite Powder +0.05% polyester
 of Example 3 _____ 35

TABLE IIA

Additives in polypropylene B: 160° C. oven life, hours
Control (polypropylene B) _____ 0.2
0.05% polyester of Example 1 _____ 1
0.10% polyester of Example 1 _____ 1
0.05% polyester of Example 4 _____ 1
0.10% polyester of Example 4 _____ 1
0.05% 2-tert.-butyl-4-(2,3-epoxypropyloxy)-phenol _____ 2

Additives in polypropylene: 160° C. oven life, hours
0.05% 2-tert.-butyl-4-(2,3-epoxypropyloxy)phenol 0.1% polyester of Example 1 __ 70
0.05% 2-tert.-butyl-4-(2,3-epoxypropyloxy)phenol +0.1% polyester of Example 4__ 105
0.05% Santowhite Powder _____ 3
0.05% Santowhite Powder +0.05% polyester
 of Example 1 _____ 150
0.05% Santowhite Powder +0.05% polyester
 of Example 4 _____ 150

Additional stabilization of polypropylene with representative 3,3'-thiodipropionic polyesters and polyester-phenolic antioxidant synergistic combinations Several additional samples prepared as in regard to Table I where evaluated by the oven storage method described above to further show the stabilizing effect of the additives of this invention. The results of this evaluation are reported in Table III which follows:

TABLE III

| Additives in Polypropylene | 160° C. Oven Life | |
|---|---|---|
| | Polypropylene A, hours | Polypropylene B, hours |
| Control (no additive) | 0.2 | 0.2 |
| 0.1% polyester of Example 4 | | 1 |
| 0.3% polyester of Example 4 | | 2 |
| 0.1% polyester of Example 1 | 1 | 1 |
| 0.3% polyester of Example 1 | 1.5 | 2 |
| 0.1% 2,6-di-tert.-butyl-p-cresol | | 1 |
| 0.1% 2,6-di-tert.-butyl-g-cresol+0.3% polyester of Example 1 | | 7 |
| 0.1% butylated hydroxyanisole | | 4 |
| 0.1% butylated hydroxyanisole+0.3% polyester of Example 1 | | 15 |
| 0.1% propyl gallate | | 5 |
| 0.1% propyl gallate+0.3% polyester of Example 1 | | 25 |
| 0.05% 2,4,5-trihydroxybutyrophenone | | 4 |
| 0.05% 2,4,5-trihydroxybutyrophenone+0.3% polyester of Example 1 | | 15 |
| 0.05% 2-tert.-butyl-4-(2,3-epoxypropyloxy)phenol | | 6 |
| 0.05% 2-tert.-butyl-4-(2,3-epoxy-propyloxy)phenol+0.10% polyester of Example 1 | | 70 |
| 0.05% 2-tert.-butyl-4-(2,3-epoxypropyloxy)phenol+0.10% polyester of Example 4 | | 80 |
| 0.1% Santowhite powder | 5 | |
| 0.05% Santowhite powder | 3 | |
| 0.05% Santowhite powder+0.05% polyester of Example 1 | 190 | |
| 0.05% Santowhite powder+0.05% polyester of Example 3 | 35 | |
| 0.05% Santowhite powder +0.1% polyester of Example 1 | 240 | |

Stabilization of polyethylene with representative 3,3'-thiodipropionic polyesters and polyester-phenolic antioxidant synergistic combinations A series of examples prepared in accordance with the procedure given in regard to Table I was analyzed in accordance with the above-described oven storage test to illustrate the effectiveness of the stabilizers of this invention in polyethylene. The polyethylene used had a density of about 0.9 and a melt index of about 7.59. The following table (Table IV) includes the results of these tests and gives a clear indication of the synergistic effect of the polyester-phenolic antioxidant combination of this inventon in polyethylene. Santowhite Powder is 4,4'-butylidenebis(6-tert.-butyl-m-cresol), Nonox WSP is 2,2'-methylenebis [6-(-methylcyclohexyl)-p-cresol], and Santonox R is 4,4'-thiobis(6-tert.-butyl-m-cresol).

TABLE IV

Additives in polyethylene: 160° C. oven life, hours
Control (polyethylene) _____ 4
0.025% polyester of Example 4 _____ 10
0.025% polyester of Example 1 _____ 7
0.025% Santowhite Powder _____ 15
0.025% Santowhite Powder + 0.025% polyester
 of Example 4 _____ 30
0.025% Santowhite Powder + 0.025% polyester
 of Example 1 _____ 30

Additives in polypropylene: 160° C. oven life, hours
- 0.025% Nonox WSP _____ 85
- 0.025% Nonox WSP + 0.025% polyester of Example 4 _____ 150
- 0.025% Nonox WSP + 0.025% polyester of Example 1 _____ 150
- 0.025% Santonox R _____ 30
- 0.025% Santonox R +0.025% polyester of Example 4 _____ 50
- 0.025% Santonox R +0.025% polyester of Example 1 _____ 50
- 0.025% 2 - tert. - butyl-4-(2,3-epoxypropyloxy)- phenol _____ 7
- 0.025% 2 - tert. - butyl-4-(2,3-epoxypropyloxy)- phenol +0.025% polyester of Example 1 ___ 35

Stabilization of polypropylene with additional representative polyesters and polyester-phenolic antioxidant combinations The polyesters of Examples 9 through 12 described in our above-mentioned application Ser. No. 77,862 were dry blended alone and in combination with representative phenolic antioxidants in polypropylene having a density of about 0.91 and a viscosity of 1.48 in tetralin at 145° C. Oven storage results measured as in regard to Table I on 1/16-inch-thick plates are recorded in the following table, Table V.

TABLE V.—STABILIZATION OF POLYPROPYLENE

Additives in polypropylene: 160° C. oven life, hours
- Control _____ 0.2
- 0.1% polyester of Example 9 _____ 1
- 0.1% polyester of Example 11 _____ 1
- 0.1% polyester of Example 12 _____ 1
- 0.1% polyester of Example 10 _____ 1
- 0.05% Santowhite Powder _____ 3
- 0.05% Santowhite Powder +0.1% polyester of Example 9 _____ 80
- 0.05% Santowhite Powder +0.1% polyester of Example 11 _____ 80
- 0.05% Santowhite Powder +0.1% polyester of Example 12 _____ 70
- 0.05% Santowhite Powder +0.1% polyester of Example 10 _____ 80
- 0.05% Santonox R _____ 40
- 0.05% Santonox R +0.10% polyester of Example 9 _____ 100
- 0.05% Santonox R +0.10% polyester of Example 11 _____ 100
- 0.05% Santonox R +0.10% polyester of Example 12 _____ 100
- 0.05% Santonox R +0.10% polyester of Example 10 _____ 100
- 0.05% Nonox WSP _____ 7
- 0.05% Nonox WSP +0.1% polyester of Example 9 _____ 100
- 0.05% Nonox WSP +0.1% polyester of Example 11 _____ 100
- 0.05% Nonox WSP +0.1% polyester of Example 12 _____ 100
- 0.05% Nonox WSP +0.1% polyester of Example 10 _____ 100
- 0.1% BHT _____ 1
- 0.1% BHT +0.1% polyester of Example 9 ___ 6
- 0.1% BHT +0.1% polyester of Example 11 ___ 6
- 0.1% BHT +0.1% polyester of Example 12 __ 5
- 0.1% propyl gallate _____ 5
- 0.1% propyl gallate +0.1% polyester of Example 9 _____ 20
- 0.1% propyl gallate +0.1% polyester of Example 11 _____ 21
- 0.1% propyl gallate +0.1% polyester of Example 12 _____ 15
- 0.05% 2,4,5-trihydroxybutyrophenone _____ 4

Additives in polypropylene: 160° C. oven life, hours
- 0.05% 2,4,5-trihydroxybutyrophenone +0.10% polyester of Example 9 _____ 16
- 0.05% 2,4,5-trihydroxybutyrophenone +0.10% polyester of Example 11 _____ 15
- 0.05% 2,4,5-trihydroxybutyrophenone +0.10% polyester of Example 12 _____ 10
- 0.05% 2,4,5-trihydroxybutyrophenone +0.10% polyester of Example 10 _____ 15
- 0.1% N-(4-hydroxyphenyl)morpholine _____ 3
- 0.1% N-(4-hydroxyphenyl)morpholine +0.1% polyester of Example 9 _____ 100
- 0.1% N-(4-hydroxyphenyl)morpholine +0.1% polyester of Example 11 _____ 100
- 0.1% 2,6 - di - t - butyl-p-dimethylaminomethyl- phenol _____ 4
- 0.1% 2,6-di-t-butyl-p-dimethylaminomethylphe- nol +0.1% polyester of Example 1 _____ 60
- 0.1% 2,6-di-t-butyl-p-dimethylaminomethylphe- nol +0.1% polyester of Example 9 _____ 60

Stabilization of polyethylene with additional representative polyesters and polyester-phenolic antioxidant combinations The polyesters of Examples 9 through 12 of Ser. No. 77,862 were dry blended alone and in combination with representative phenolic antioxidants in polyethylene having a density of about 0.91 and a melt index of 7.59. Oven storage results measured as in regard to Table I on 1/16-inch-thick plates are recorded in the following table, Table VI. BHT is 2,6-di-tert-butyl-p-cresol.

TABLE VI.—STABILIZATION OF POLYETHYLENE

Additives in polyethylene: 160° C. oven life, hours
- Control _____ 4
- 0.025% polyester of Example 9 _____ 8
- 0.025% polyester of Example 11 _____ 9
- 0.025% polyester of Example 10 _____ 7
- 0.025% polyester of Example 12 _____ 8
- 0.1% BHT _____ 6
- 0.1% BHT +0.025% polyester of Example 9 __ 15
- 0.1% BHT +0.025% polyester of Example 11 _ 15
- 0.025% Santowhite Powder _____ 15
- 0.025% Santowhite Powder +0.025% polyester of Example 9 _____ 29
- 0.025% Santowhite Powder +0.025% polyester of Example 11 _____ 31
- 0.025% Santowhite Powder +0.025% polyester of Example 10 _____ 31
- 0.025% Santowhite Powder +0.025% polyester of Example 12 _____ 30
- 0.025% Nonox WSP _____ 85
- 0.025% Nonox WSP +0.025% polyester of Example 9 _____ 100
- 0.025% Nonox WSP +0.025% polyester of Example 11 _____ 100
- 0.025% Nonox WSP +0.025% polyester of Example 10 _____ 100
- 0.025% Nonox WSP +0.025% polyester of Example 12 _____ 100
- 0.025% Santonox R _____ 30
- 0.025% Santonox R +0.025% polyester of Example 9 _____ 50
- 0.025% Santonox R +0.025% polyester of Example 11 _____ 50
- 0.025% Santonox R +0.025% polyester of Example 10 _____ 50
- 0.025% Santonox R +0.025% polyester of Example 12 _____ 50

The following example is given to show the comparative ineffectiveness of complex polyesters prepared from thiodipivalic acid and neopentyl glycol as thermal stabilizers for poly-α-olefins as well as their inability to produce synergistic results when incorporated in poly-α-olefins together wtih phenolic antioxidants.

Example A.—Lack of stabilization of poly-α-olefins by representative thiodipivalic polyesters and polyester-phenolic antioxidant combinations Several polyesters prepared as in Example 8 of Ser. No. 77,862 (thiodipivalic acid polyesters) were dry blended alone and in combination with representative phenolic antioxidants in polypropylene powder and the antioxidant effect determined by the oven storage test described above after molding into 1/16-inch-thick plates. The results are recorded in Table VII which follows. These results clearly demonstrate the ineffectiveness as poly-α-olefin antioxidants of polyesters of thiodiacids other than those of 3,3'-thiodipropionic and 4,4'-thiodibutyric acid.

TABLE VII

Additives in polypropylene B: 160° C. oven life, hours
Control (polypropylene B) _____ 0.2
0.1% polyester of Example 8 _____ 0.5
0.3% polyester of Example 8 _____ 0.5
0.1% 2,6-di-tert.-butyl-p-cresol _____ 1
0.1% 2,6-di-tert.-butyl-p-cresol +0.1% polyester of Example 8 _____ 1
0.1% butylated hydroxyanisole _____ 4
0.1% butylated hydroxyanisole +0.1% polyester of Example 8 _____ 4

The present invention thus provides novel poly-α-olefin compositions having stability against deterioration resulting from exposure to elevated temperatures and novel complex polyester stabilizers and synergistic stabilizer combinations of complex polyesters and phenolic antioxidants for poly-α-olefin compositions.

In addition, since paraffin wax is closely related to polyolefins, this invention also provides such novel compositions having paraffin wax as the principal or entire substrate being stabilized.

In the following tables stability was determined in accordance with the Active Oxygen Method, according to which method air was bubbled through the material to be tested containing the antioxidant at the temperature indicated and the oxidation was followed by determination of the milliequivalents of peroxide formed per kilogram of substrate. The results are indicated in terms of number of hours required to reach a Peroxide Value (PV) of 20 milliequivalents. In the following tables percent figures refer to percent by weight of the oxidizable materials.

TABLE VIII

| Additives in Paraffin Wax | Percent | AOM Value at 150° C. hr. to 20 meq. Peroxides |
|---|---|---|
| Control | 0 | 4 |
| Polyester of Example 9 | 0.01 | 13 |
| Polyester of Example 11 | 0.01 | 13 |
| Polyester of Example 12 | 0.01 | 11 |
| Polyester of Example 10 | 0.01 | 11 |
| Polyester of Example 8 (Thiodipivalic Acid Polyester) | 0.01 | 3 |

TABLE IX

Additives in wax: AOM value at 150° C. (hours)
Control (wax with no additive) _____ 4
0.01% polyester of Example 4 _____ 14
0.01% polyester of Example 1 _____ 13
0.01% polyester of Example 2 _____ 12
0.01% polyester of Example 3 _____ 11
0.01% polypentamethylenethiodipropionate ____ 11
0.01% acetylated polypentamethylenethiodipropionate _____ 14
0.1% butylated polypentamethylenethiodipropionate _____ 11

TABLE X.—STABILIZATION OF PARAFFIN WAX

| Additives in Paraffin Wax | Percent | AOM Value at 150° C. hr. to 20 meq. Peroxides |
|---|---|---|
| Control | 0 | 4 |
| Polyester of Example 9 | 0.01 | 13 |
| Polyester of Example 11 | 0.01 | 13 |
| Polyester of Example 12 | 0.01 | 11 |
| Polyester of Example 10 | 0.01 | 11 |
| Polyester of Example 8 (Thiodipivalic Acid Polyester) | 0.01 | 3 |

The irrelevant prior art cited against the parent application included U.S. 2,669,507 which pertains to mercaptoalkanoic acids which are not thioethers but contain a free mercapto group and thus have no resemblance to the polyesters of thiodialkanoic acid described in the present application, and furthermore, esters of these mercaptoalkanoic acids have very little if any stabilizing activity when used in combination with a conventional polyolefin phenolic antioxidant. This is readily seen by the data presented in the table as follows:

TABLE XI

| Additive in Polypropylene | Stability Data in Hours | |
|---|---|---|
| | 160° C. Oven life | 140° C. Stress life |
| (1) None (control) | 0.2 | 5 |
| (2) 0.1% 4,4'-butylidenebis(6-t-butyl-m-cresol), called SP below | 15 | 60 |
| (3) 0.05% SP+0.1% isooctyl mercaptoacetate | 15 | 25 |
| (4) 0.05% SP+0.1% ethylene glycol dimercaptoacetate | 10 | 40 |
| (5) 0.1% dilauryl 3,3'-thiodipropionate, called DLTDP | 1 | 15 |

As can be seen from this table, ordinary antioxidants such as shown by lines (2) and (5) are of only moderate efficacy as stabilizers for polypropylene. Moreover, lines (3) and (4) show that the combined use of a mercaptoacetate ester does not produce any significant change in the results.

In various tables presented below, the name of the polyester has been replaced with a symbolic term. The meaning of the symbolic terminology is as follows:

Poly TDP 600 was prepared from 3,3'-thiodipropionic acid, ethylene glycol and 2-ethylhexanol having a molecular weight of about 600. Prepared by procedure described in Example 1 of the parent application Ser. No. 77,863 wherein ethylene glycol and 2-ethylhexanol was used in place of neopentyl glycol and 2,2-dimethylpentanol, respectively.

Poly TDP 491 same as Poly TDP 600 except lower molecular weight of 491.

Poly TDP 571 see Example 4 of parent application (3,3'-thiodipropionic acid, ethylene glycol and butanol).

Poly TDP 1150 similar to Example 2 of parent application except using ethylene glycol and 2-ethylhexanol in place of neopentyl glycol and 2,2-dimethylpentanol respectively.

Poly TDP 1350 similar to Poly TDP except higher molecular weight.

Poly TDP 1445 see Example 3 of parent application (3,3'-thiodipropionic acid, neopentyl glycol and 2,2-dimethylpentanol).

Poly TDP 1098S see Example 18 of continuation-in-part of Ser. No. 77,862 (3,3'-thiodipropionic acid, ethylene glycol and stearyl alcohol).

Poly TDP 760SA see Example 19 of continuation-in-part of Ser. No. 77,862 (3,3'-thiodipropionic acid, ethylene glycol and stearic acid).

Poly TDP 1100 see Example 2 of parent application (3,3'-thiodipropionic acid, neopentyl glycol and 2,2-dimethylpentanol).

Poly TDP 717L see Example 12 of parent application, 3,3'-thiodipropionic acid and ethylene glycol (not terminated).

Poly TDP 712L see Example 14 of continuation-in-part of Ser. No. 77,862 (3,3'-thiodipropionic acid, ethylene glycol and 2,2'-dimethyldecanol).

Poly TDP 747S see Example 16 of continuation-in-part of Ser. No. 77,862 (3,3'-thiodipropionic acid, ethylene glycol and stearyl alcohol).

Poly TDP 2000-S see Example 20 of continuation-in-part of Ser. No. 77,862 (3,3'-thiodipropionic acid, 1,4-cyclohexanedimethanol and stearyl alcohol).

TABLE XII

| Additives in Wax | Percent by Weight | AOM Value at 150° C. Hours to 20 meq. of Peroxides |
|---|---|---|
| (1) Control, no stabilizers | 0 | 4 |
| (2) DLTDP (dilauryl 3,3'-thiodipropionate) | 0.01 | 5 |
| (3) DSTDP (distearyl 3,3'-thiodipropionate) | 0.01 | 5 |
| (4) Poly TDP 600 | 0.01 | 13 |
| (5) Poly TDP 717L | 0.01 | 17 |
| (6) Poly TDP 712L | 0.01 | 18 |
| (7) Poly TDP 747S | 0.01 | 20 |
| (8) Poly TDP 816S | 0.01 | 20 |
| (9) Poly TDP 1098S | 0.01 | 21 |
| (10) Poly TDP 760SA | 0.01 | 19 |

TABLE XIII

| Additives in Polyprolylene [1] | Heat Stability Data, hr. (1/16" Thick Sample) | |
|---|---|---|
| | 160° C. Oven Life | 140° C. Stress Life |
| (1) Unstabilized 402 polypropylene (X3816-92) | 0.3 | 1.5 |
| (2) Item No. 1+0.1% DLTDP (dilauryl 3,3'-thiodipropionate) | 7 | 40 |
| (3) Item No. 1+0.1% Poly TDP 600 | 18 | |
| (4) Item No. 1+0.1% Poly TDP 717 | 13 | 100 |
| (5) Item No. 1+0.1% Poly TDP 712L | 12 | 105 |
| (6) Item No. 1+0.1% Poly TDP 747S | 10 | 90 |
| (7) Item No. 1+0.1% Poly TDP 1098S | 20 | 185 |
| (8) Item No. 1+0.1% Poly TDP 760SA | 10 | 140 |

[1] Polypropylene: I.V. at 145° C.=1.79, melt flow at 230° C./2.16 kg.= 4.52, molecular weight greater than 15,000.

TABLE XIV.—HEAT STABILITY DATA IN HOURS

| Additives in Poly-1-olefins | Polybutene-1 [1] 160° C. Oven Life | Copolymer P/B [2] 160° C. Oven Life | 402I Polyallomer [3] 160° C. Oven Life |
|---|---|---|---|
| (1) Unstabilized | 0.5 | 0.2 | 0.3 |
| (2) Item No. 1+0.1% DLTDP | 3 | 2 | 3 |
| (3) Item No. 1+0.1% Poly TDP 717L | 4 | 2 | 4 |
| (4) Item No. 1+0.1% Poly TDP 816S | 5 | 3 | 6 |
| (5) Item No. 1+0.1% Poly TDP 1098S | 5 | 4 | 6 |
| (6) Item No. 1+0.1% Poly TDP 760SA | 4 | 2 | 5 |

[1] Polybutene-1: I.V. at 145° C.=1.9 and molecular weight greater than 15000.
[2] Copolymer P/B is 90/10 porpylene to butene-1 polymer with an I.V. at 145° C.=2.6 and molecular weight greater than 15000.
[3] 402I Polyallomer is a propylene polyallomer containing isoprene with an I.V. at 145° C.=1.80, density=0.916 and molecular weight greater than 15000.

As already indicated hereinabove, we found that when ultraviolet light inhibitors are incorporated into a poly-1-olefin containing polyesters of thiodialkanoic acid or synergistic combinations of these polyesters with a phenolic or amine antioxidant, superior weathering characteristics are obtained. Organic phosphite stabilizers can be used advantageously in conjunction with these stabilized poly-1-olefin compositions. The types of ultraviolet inhibitors which can be used advantageously in the practice of this invention are listed below:

(1) Derivatives of 2-hydroxybenzophenone
(2) Derivatives of phenylsalicylate
(3) Other ultraviolet light inhibitors such as the benzothiazoles and monoesters of resorcinol can also be used.

The general structure for 2-hydroxybenzophenone derivatives is shown below:

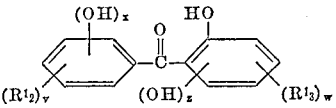

where $R^1_2$ and $R^1_3$ may be the same or different and can be selected from hydrogen, an alkyl radical, an alkyloxy and an acyloxy radical. The alkyl, alkyloxy or acyloxy radical may contain from 1 to 24 carbon atoms: $v$, $w$, $x$, and $z$ can be 0, 1 or 2.

Illustrative examples of these 2-hydroxybenzophenones are:

2-hydroxybenzophenone
2,4-dihydroxybenzophenone
2,2'-dihydroxybenzophenone
4-octyl-2-hydroxybenzophenone
4,4'-didodecyl-2-hydroxybenzophenone
4-methoxy-2-hydroxybenzophenone
4-octyloxy-2-hydroxybenzophenone
4-octadecyl-2-hydroxybenzophenone
4-octyloxy-2,2'-dihydroxybenzophenone
4-dodecyloxy-2,2'-dihydroxybenzophenone
4,4'-dimethoxy-2,2'-dihydroxybenzophenone
4,4'-didodecyloxy-2,2'-dihydroxybenzophenone
2,4,4'-trihydroxybenzophenone 4,4'-distearate
4-phenylcarbonyl-3-hydroxyphenylstearate
4-phenylcarbonyl-3-hydroxyphenyllaurate The general structure for the phenylsalicylate derivatives is shown below:

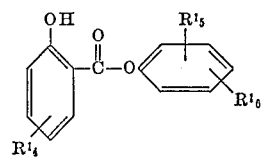

where $R^1_4$, $R^1_5$ and $R^1_6$ are selected from hydrogen, or alkyl or aryl radicals, having from 1 to 24 carbons. Illustrative examples of these phenylsalicylates are listed below:

phenylsalicylate
p-t-octylphenylsalicylate
p-dodecylphenylsalicylate
p-octadecylphenylsalicylate
2,6-dimethylphenylsalicylate
p-t-octylphenyl 5-t-butylsalicylate
p-decylphenyl 5-t-butylsalicylate
p-dodecylphenyl 5-t-butylsalicylate
p-(1-methylheptadecyl)phenyl 5-t-butylsalicylate
p-dodecylphenyl 5-phenylsalicylate
p-dodecylphenyl 5-dodecylsalicylate The so-called organic hydrocarbon-substituted phosphite stabilizers referred to hereinabove can advantageously be of those general types for which the general and specific structures are presented below as follows:

(a) Tris alkylated phenylphosphites

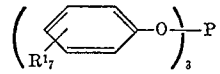

where $R^1_7$ is an alkyl radical of 1 to 24 carbons and preferably 6 to 18 carbons. Illustrative examples are tris butylphenylphosphite, tris octylphenylphosphite, tris nonylphenylphosphite, and tris octadecylphenylphosphite.

(b) Dialkylpentaerythritoldiphosphites

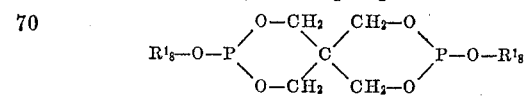

where $R^1_8$ is an alkyl radical having from 4 to 24 carbon atoms, with the preferred range from 10 to 24 carbons.

Illustrative examples are: didecylpentaerytoldiphosphite, didoceylpentaerythritoldiphosphite, dioctadecylpentaerythritoldiphosphite and didocosanylpentaerythritoldiphosphite.

(c)

$$(R_9-C-R'_9)_n \begin{array}{c} CH_2-O \\ \\ CH_2-O \end{array} P-OR''_9$$

e.g., neopentyl-phenyl phosphite, neopentyl octadecyl phosphite, etc.

(d)

$$(R_9-C-R'_9)_n \begin{array}{c} CH_2-O \\ \\ CH_2-O \end{array} P-O-X_1-O-P \begin{array}{c} O-CH_2 \\ \\ O-CH_2 \end{array} (R_9-C-R'_9)_n$$

e.g., 1,4-cyclohexanedimethanol bis(neopentyl phosphite), bisphenol-A bis(neopentyl phosphite), etc.

where $R_9$ and $R'_9$ are hydrogen or alkyl (1–10 carbon) radicals, where $R''_9$ is a hydrogen, alkyl, aryl, or a cycloalkyl radical (1–18 carbon), where $X_1$ is an alkylene (1–10 carbon) radical, $$\left( \begin{array}{c} R_9 \\ -C- \\ R_9 \end{array} \right)_m$$

cycloalkyl, e.g., $$-CH_2-\langle\rangle-CH_2-$$

or alkaryl, e.g.

$$-\langle\rangle-\overset{R_9}{\underset{R_9}{C}}-\langle\rangle-$$

and where $m$ is an integer of at least 1 up to 10 or more.

(e)

$$H-\left[-O-P \begin{array}{c} O-CH_2 \\ \\ O-CH_2 \end{array} C \begin{array}{c} CH_2-O \\ \\ CH_2-O \end{array} P-\right]_p OH$$

e.g., poly PE-P (polymeric pentaerythritol phosphite)

(f)

$$H-\left[-O-P \begin{array}{c} O-CH_2 \\ \\ O-CH_2 \end{array} C \begin{array}{c} CH_2-O \\ \\ CH_2-O \end{array} P-O-\langle\rangle-\overset{CH_3}{\underset{CH_3}{C}}-\langle\rangle-\right]_p OH$$

e.g., HRS1620 which is a polymeric bisphenol A, pentaerythritol, phosphite.

(g)

$$H-\left[-O-P \begin{array}{c} O-CH_2 \\ \\ O-CH_2 \end{array} C \begin{array}{c} CH_2-O \\ \\ CH_2-O \end{array} P-OCH_2-\langle\rangle-\right]_p OH$$

e.g., polymeric 1,4-cyclohexanedimethanol, pentaerythritol, phosphite.

In Formulas e, f and g, $p$ can be an integer of at least 2 up to 15 or more.

(h) Polymeric product obtained from reacting 1,4-cyclohexane-dimethanol and triphenyl phosphite.

The amounts of ultraviolet light inhibitor used in the thermally stabilized compositions can be widely varied. The stabilizing amounts of the ultraviolet light inhibitor usually varies from 0.01 to 10% by weight of the poly-1-olefin with the preferred amounts ranging from 0.1 to 3%.

In the poly-1-olefin compositions covered by this invention where an organic phosphite is used, its concentration levels can advantageously range from 0.01 to 5% with the preferred range being from 0.05 to 1%.

The poly-1-olefins referred to herein cover those polymers prepared by (1) polymerizing an α-monoolefin containing 2 to 22 carbon atoms, (2) polymerizing a mixture of α-monoolefins containing 2 to 22 carbons, (3) polymerizing an α-monoolefin containing 2 to 22 carbons with a diolefin including isoprene, butadiene and substituted butadiene, (4) polymerizing an α-monoolefin with acrylates, styrene, etc., and (5) admixtures of polyamides, polyesters, synthetic rubbers, etc., in a poly-1-olefin. Copolymers, graft and block polymers of α-monoolefins as the backbone of a polymer are included herein. Examples of poly-1-olefins which can be used as homopolymers, copolymers, mixed polymers, etc., as just described include ethylene, propylene, butene-1, dodecene-1, octadecene-1, docosens-1, etc.

Additional examples illustrative of this invention employ polypropylene as representative of the various poly-1-olefins within the scope of this invention. For these examples the stabilizers were blended into the propylene using a midget Banbury mixer, having a 270 g. capacity. The mixing time was 6 minutes with the temperature reaching 260 to 280° F. during the blending. The mixed batch was sheeted out in an 18" x 18" 70 ton press and then granulated. Usually 4 to 6 mixes were made, granulated and dry blended to produce 2 to 4 lb. of each composition. The spinning and drafting conditions which were used in the following examples are for illustration only and other methods and conditions may be used without adversely limiting the usefulness or effectiveness of the stabilizers described herein.

The granulated stabilized polypropylene, base resin having an I.V. of 1.1 as determined on a 0.25% solution in tetralin at 145° C. and melt flow of 35 at 23P° C./2.16 kg., was extruded into 12 denier multifilaments by spinning at about 250° C. and then drafting about 4 to 1. The skeins of polypropylene multifilaments, wound onto a 6-inch long stainless steel frame, were aged in an Atlas Weather-Ometer(dry) and at intervals a 6-inch section was removed from the skein for tenacity measurement using an Instron tester. The results showing the weatherability of nonpigmented and pigmented polypropylene, are presented in Tables XV, XVI and XVII. The superiority of polypropylene containing Poly TDP over that containing DLTDP (dilauryl 3,3'-thiodipropionate) is seen by comparing data for item 13 with that of 14, 15, 16, and 17 in Table XV.

Monofilaments of about 500 denier were extruded from stabilized polypropylene base resin having an I.V. of 1.4 (at 145° C. in tetralin) and density of 0.91. The monofilaments were woven into ½-inch wide flat braids for weathering in an Atlas Weather-Ometer(dry) for intervals of 300, 600, 1000 and 1500 hours. These samples were tested for strength (T) and percent elongation (E) by breaking the whole braid on the Instron tester and calculating percent of original toughness ($T \times E$) retained are presented in Tables XVIII to XXI inclusive. In Table 5VIII data for items 3 and 4 show the superiority of Poly TDP over DLTDP in polypropylene monofilaments.

Symbols used in the following tables, which have not already been explained, have the following meaning:

BHT—2,6-di-t-butyl-p-cresol
BMHPC—2,6-bis(1-methylheptadecyl)-p-cresol
DDPC—2,6-didodecyl-p-cresol
DHBP—4-dodecyloxy-2-hydroxybenzophenone
DLTDP—dilauryl 3,3'-thiodipropionate
DSPDP—distearyl pentaerythritoldiphosphite
HRS1620—a polymeric bisphenol A, pentaerythritol, phosphite sold by Hooker Chemical Co.
OHBP—4-octyloxy-2-hydroxybenzophenone
OPS—p-t-octylphenylsalicylate
OPBS—p-t-octylphenyl-5-t-butylsalicylate OPOS—p-t-octylphenyl-5-t-octylsalicylate
Poly PE–P—polymeric pentaerythritol phosphite
SP—4,4'-butylidenebis(6-t-butyl-m-cresol)
SPSS—p-octadecylphenyl-5-octadecylsalicylate
SR—4,4'-thiobis(6-t-butyl-m-cresol)
THSP—2',4',5'-trihydroxystearophenone
TMHP—2,4,6-tris(1-methylheptadecyl)-phenol TNPP—tris nonylphenylphosphite
Titanium dioxide—Rutile R610
Uvinul 400—2,4-dihydroxybenzophenone
Uvinul M–40—2-hydroxy-4-methoxybenzophenone
Uvinul D–49—2,2'-dihydroxy-4,4'-dimethoxybenzophenone
Uvinul D–50—2,2',4,4'-tetrahydroxybenzophenone.

TABLE XV

| Polypropylene Multifilament Samples (skeins of 12-denier yarn), Additives | Titanium Dioxide, Percent | Percent Original Property Retained After Aging in an Atlas Weather-Ometer (Percent Tenacity Retained) | | | | | | | |
|---|---|---|---|---|---|---|---|---|---|
| | | 60 Hrs. | 100 Hrs. | 150 Hrs. | 200 Hrs. | 250 Hrs. | 300 Hrs. | 350 Hrs. | 450 Hrs. |
| (1) 1% OPS | 0.25 | 36 | 19 | 10 | (1) | | | | |
| (2) 1% OPS+0.5% Poly TDP 1150 | 0.25 | 97 | 99 | | 76 | 45 | 37 | | |
| (3) 1% OPS+0.5% Poly TDP 1350 | 0.25 | | 100 | | 83 | 80 | 37 | | |
| (4) 1% OPS+0.5% Poly TDP 571+0.3% SP | 0 | | 95 | | 76 | | 59 | 42 | 30 |
| (5) 1% OPS+0.5% Poly TDP 1445+0.3% SP | 0 | | 100 | | 92 | | 69 | 58 | |
| (6) 1% OPS+0.5% Poly TDP 1445+0.3% THSP | 0 | | 99 | | 70 | | 61 | 34 | 31 |
| (7) 1% OPS+0.5% Poly TDP 1098S | 0 | | 100 | | 96 | | 72 | | 49 |
| (8) 1% OPS+0.5% Poly TDP 1098S+0.1% BMHPC | 0 | | 100 | | 97 | | 70 | | 51 |
| (9) 1% OPS+0.5% Poly TDP 1098+0.1% BMHPC +0.5% DSPDP | 0 | | 100 | | 96 | | 73 | | 58 |
| (10) 1% DHBP | 0.5 | | 27 | 10 | (1) | | | | |
| (11) 1% DHBP+1% DLTDP+0.05% SP | 0.5 | | 92 | 84 | 76 | | 57 | 24 | (1) |
| (12) 1% DHBP+1% Poly TDP 491+0.05% SP | 0.5 | | 100 | 100 | 88 | | 76 | 56 | 30 |
| (13) 1% DHBP+1% Poly TDP 1100+0.05% SP | 0.5 | | 94 | | 78 | | 68 | 52 | 35 |
| (14) 1% DHBP+1% Poly TDP 491+0.05% SP | 0 | | 100 | | 92 | | 70 | 50 | 27 |
| (15) 1% DHBP+1% Poly TDP 1100+0.05% SP | 0 | | 100 | | 88 | | 65 | 49 | 26 |

[1] Fiber too weak to test.

TABLE XVI

| Polypropylene Multifilament Samples (skeins of 12-denier yarn), Additives | Titanium Dioxide, Percent | Percent Original Property Retained After Aging in an Atlas Weather-Ometer (Percent Tenacity Retained) | | | | |
|---|---|---|---|---|---|---|
| | | 141 Hrs. | 259 Hrs. | 355 Hrs. | 473 Hrs. | 589 Hrs. |
| (1) 1% DHBP | 2.0 | 40 | 10 | (1) | | |
| (2) 1% DHBP+0.5% Poly TDP 600 | 2.0 | 57 | 20 | 8 | | |
| (3) 1% DHBP+0.5% Poly TDP 600+0.3% DDPC | 2.0 | 60 | 20 | 10 | (1) | |
| (4) 1% DHBP+0.5% Poly TDP 600+0.3% DDPC +0.5% DSPDP | 2.0 | 65 | 24 | 15 | 12 | 10 |
| (5) 1% DHBP+0.5% Poly TDP 600+0.3% DDPC | 0 | 75 | 62 | 39 | 27 | 15 |
| (6) 1% DHBP+0.5% Poly TDP 600+0.3% SP | 0 | 71 | 63 | 34 | 21 | 14 |
| (7) 1% DHBP+0.5% Poly TDP 600+0.3% SP | 2 | 55 | 30 | 17 | 8 | (1) |
| (8) Item No. 6+0.5% DSPDP | 2 | 65 | 34 | 23 | 16 | 12 |
| (9) Item No. 6+0.5% TNPP | 2 | 61 | 30 | 20 | 14 | 10 |
| (10) 1% DHBP+0.5% Poly TDP 600+0.25% BMHPC | 0 | 87 | 68 | 47 | 33 | 20 |
| (11) 1% DHBP+0.5% Poly TDP 600+0.25% BMHPC | 2 | 61 | 35 | 24 | 21 | 10 |
| (12) Item No. 10+0.5% DSPDP | 2 | 67 | 39 | 28 | 24 | 10 |
| (13) 1% DHBP+0.5% Poly TDP 600+0.25% SR | 0 | 69 | 60 | 35 | 24 | 15 |
| (14) 1% DHBP+0.5% Poly TDP 600+0.25% SR | 2 | 57 | 34 | 27 | 19 | 8 |
| (15) Item No. 13+0.5% DSPDP | 2 | 62 | 37 | 33 | 22 | 15 |
| (16) 2% DHBP+1% Poly TDP 600+0.5% DSPDP | 2 | 82 | 72 | 57 | 32 | 23 |
| (17) 1% DHBP+0.5% Poly TDP 1098S+0.25% BMHPC | 2 | 69 | 50 | 42 | 24 | 15 |
| (18) Item No. 17+0.25% SP | 2 | 65 | 51 | 37 | 24 | 10 |
| (19) 1% DHBP+0.5% Poly TDP 760 SA+0.25% BMHPC | 2 | 66 | 48 | 37 | 21 | 12 |
| (20) 1% DHBP+0.5% Poly TDP 760 SA+0.25% BMHPC+0.25% SP | 2 | 63 | 46 | 30 | 23 | 8 |

[1] Fiber to weak to test.

TABLE XVII

| Polypropylene Multifilament Samples (skeins of 12-denier yarn), Additives | Titanium Dioxide, percent | Percent Original Property Retained After Aging in an Atlas Weather-Ometer (Percent Tenacity Retained) | | | |
|---|---|---|---|---|---|
| | | 63 Hrs. | 142 Hrs. | 275 Hrs. | 350 Hrs. |
| (1) 2% OPS | 0 | 62 | 15 | (1) | (1) |
| (2) 2% OPS+0.5% TNPP | 0 | 78 | 34 | (1) | (1) |
| (3) 2% OPS+1% Poly TDP 1350 | 0 | 87 | 67 | 15 | 10 |
| (4) 2% OPS+1% Poly TDP 1350 | 0.25 | 81 | 60 | 14 | 8 |
| (5) Item No. 3+0.5% TNPP | 0 | 100 | 90 | 57 | 30 |
| (6) Item No. 3+0.5% DSPDP | 0 | 100 | 94 | 66 | 36 |
| (7) Item No. 3+0.5% DSPDP | 0.25 | 92 | 79 | 51 | 25 |
| (8) 2% OPS+1% Poly TDP 1098S | 0 | 90 | 70 | 21 | 14 |
| (9) 2% OPS+1% Poly TDP 1098S | 0.25 | 87 | 65 | 15 | 14 |
| (10) 2% OPS+1% Poly TDP 1098S+0.5% DSPDP | 0 | 100 | 92 | 69 | 46 |
| (11) 2% OPS+1% Poly TDP 1098S+0.5% DSPDP | 0.25 | 97 | 90 | 56 | 32 |
| (12) 1% OPS | 0 | 30 | (1) | | |
| (13) 1% OPBS+1% Poly TDP 600 | 0 | 47 | 37 | 22 | 12 |
| (14) Item No. 13+0.5% DSPDP | 0 | 59 | 45 | 27 | 16 |
| (15) Item No. 13+0.5% DSPDP | 0.25 | 52 | 39 | 25 | 15 |
| (16) 1% OPBS+1% Poly TDP 1098S+0.5% DSPDP | 0.25 | 62 | 50 | 37 | 28 |
| (17) 1% OPOS | 0 | 27 | (1) | | |
| (18) OPOS+1% Poly TDP 1098S+0.5% DSDP | 0.25 | 63 | 51 | 34 | 29 |
| (19) 1% SPSS | 0 | 32 | (1) | | |
| (20) 1% SPSS+1% Poly TDP 1098S+0.5% DSPDP | 0.25 | 70 | 59 | 49 | 36 |

[1] Fiber too weak to test.

TABLE XVIII

| Polypropylene Monofilament Samples (Woven into ½-Inch Wide Braids), Additives | Titanium Dioxide, Percent | Percent Original Property Retained After Aging in an Atlas Weather-Ometer (Percent Toughness After Aging)[1] | | | |
|---|---|---|---|---|---|
| | | 300 Hrs. | 600 Hrs. | 1,000 Hrs. | 1,500 Hrs. |
| (1) 1% DHBP | 0 | | [2] | | |
| (2) 1% DHBP | 1.5 | | [2] | | |
| (3) 1% DHBP+0.3% SP+0.5% DLTDP | 0 | 44 | 33 | 7 | [2] |
| (4) Item No. 3+0.5% Poly TDP 600 | 0 | 101 | 52 | 17 | 10 |
| (5) 1% DHBP+0.5% Poly TDP 600+0.3% DDPC+0.5% DSPDP | 1.5 | | 71 | 28 | 2 |
| (6) 1% DHBP+1% Poly TDP 600+0.05% DDPC | 1.5 | | 56 | 12 | 1 |
| (7) 1% DHBP+1% Poly TDP 600+0.5% DSDP | 1.5 | | 44 | 34 | 2 |
| (8) 1% DHBP+1% Poly TDP 600 | 1.5 | | 69 | 29 | 3 |
| (9) Item No. 8+0.05% DDPC | 1.5 | | 37 | 36 | 2 |
| (10) 1% DHBP+0.5% Poly TDP 600+0.3% DDPC+0.5% DSPDP | 0 | | 56 | 54 | 11 |
| (11) 1% DHBP+1% Poly TDP 600+0.05% DDPC | 0 | | 57 | 38 | 4 |
| (12) 1% DHBP+1% Poly TDP 600+0.05% DDPC+0.5% DSPDP | 0 | | 51 | 32 | 20 |

[1] Toughness is the product of percent retained tenacity and percent retained elongation.
[2] Fiber too weak to test.

TABLE XIX

| Polypropylene Monofilament Samples (Woven into ½-Inch Wide Braids), Additives | Titanium Dioxide, Percent | Percent Original Property Retained After Aging in an Atlas Weather-Ometer (Percent Toughness After Aging)[1] | | | |
|---|---|---|---|---|---|
| | | 300 Hrs. | 600 Hrs. | 1,000 Hrs. | 1,500 Hrs. |
| (1) 1% DHBP | 0 | 32 | [2] | | |
| (2) 1% DHBP | 1.5 | 22 | [2] | | |
| (3) 1% DHBP+1% Poly TDP 600 | 1.5 | 76 | 53 | 16 | 4 |
| (4) Item No. 3+0.3% SP+0.3% TNPP | 1.5 | 39 | 19 | 14 | 3 |
| (5) Item No. 3+0.1% SP+0.3% TNPP | 1.5 | 38 | 36 | 16 | 4 |
| (6) Item No. 3+0.05% THSP | 1.5 | 61 | 31 | 16 | 3 |
| (7) 1% DHBP+0.5% Poly TDP 600+0.3% SP | 1.5 | 54 | 29 | 2 | |
| (8) 1% DHBP+0.5% Poly TDP 600+0.05% DDPC+0.5% DSPDP | 1.5 | | 79 | 77 | 50 |
| (9) 1% DHBP+1% Poly TDP 600 | 0 | 45 | 55 | 23 | 10 |
| (10) Item No. 9+0.3% SP+0.3% TNPP | 0 | 70 | 52 | 20 | 9 |
| (11) 1% DHBP+1% Poly TDP 600+0.1% SP+0.3% TNPP | 0 | 100 | 72 | 8 | 4 |
| (12) 1% DHBP+1% Poly TDP 600+0.05% THSP | 0 | 55 | 35 | 3 | |
| (13) 1% DHBP+0.5% Poly TDP 600+0.3% SP | 0 | 100 | 52 | 17 | 10 |
| (14) 1% DHBP+0.5% Poly TDP 600 | 0 | | 30 | [2] | |
| (15) 1% OPS | 0 | | | | |
| (16) 1% OPS | 1.5 | 25 | [2] | | |
| (17) 1% OPS+1% Poly TDP 600+0.3% SP+0.3% TNPP | 0 | 44 | 10 | 1 | |
| (18) 1% OPS+1% Poly TDP 600+0.3% SP+0.3% TNPP | 1.5 | 60 | 22 | 6 | |

[1] Toughness is the product of percent retained tenacity and percent retained elongation.
[2] Fiber too weak to test.

TABLE XX

| Propylene Monofilament Samples (Woven into ½″ Wide Braids), Additives | Titanium Dioxide, Percent | Percent Original Property Retained After Aging in an Atlas Weather-Ometer (Percent Toughness After Aging) | | | |
|---|---|---|---|---|---|
| | | 300 Hrs. | 600 Hrs. | 1,000 Hrs. | 1,500 Hrs. |
| (1) 1% Poly TDP 2000-S | 1.5 | (b) | | | |
| (2) 0.5% HRS1620 | 1.5 | (b) | | | |
| (3) 0.5% Poly PE-P | 1.5 | (b) | | | |
| (4) 0.5% TMHP | 1.5 | (b) | | | |
| (5) 1% DHBP | 1.5 | (b) | | | |
| (6) 1% DHBP+1% Poly TDP 2000-S | 1.5 | 22 | | | |
| (7) 1% OHBP+1% Poly TDP 2000-S | 1.5 | 85 | | 34 | 25 |
| (8) 1% Uvinul 400+1% Poly TDP 2000-S | 1.5 | 80 | | 31 | 23 |
| (9) 1% Uvinul M-40+1% Poly TDP 2000-S | 1.5 | 75 | | 29 | 21 |
| (10) 1% Uvinul D-50+1% Poly TDP 2000-S | 1.5 | 79 | | 31 | 21 |
| (11) 1% Uvinul D-49+1% Poly TDP 2000-S | 1.5 | 81 | | 34 | 25 |
| (12) 1% DHBP+1% Poly TDP 2000-S+0.1% BMHPC | 1.5 | 83 | | 35 | 24 |
| (13) 1% OHBP+1% Poly TDP 2000-S+0.1% BMHPC | 1.5 | 90 | | 43 | 33 |
| (14) 1% Uvinul 400+1% Poly TDP 2000-S+0.1% BMHPC | 1.5 | 89 | | 45 | 31 |
| (15) 1% Uvinul M-40+1% Poly TDP 2000-S+0.1% BMHPC | 1.5 | 93 | | 51 | 31 |
| (16) 1% Uvinul D-50+1% Poly TDP 2000-S+0.1% BMHPC | 1.5 | 90 | | 50 | 34 |
| (17) 1% Uvinul D-49+1% Poly TDP 2000-S+0.1% BMHPC | 1.5 | 95 | | 47 | 35 |
| (18) 1% DHBP+1% Poly TDP 2000-S+0.1% TMHP | 1.5 | 95 | | 47 | 33 |
| (19) Item 12+0.1% HRS1620 | 1.5 | 96 | | 45 | 36 |
| (20) Item 12+0.1% Poly PE-P | 1.5 | 94 | | 56 | 41 |
| (21) Item 12+0.1% DSPDP | 1.5 | 98 | | 57 | 42 |
| (22) Item 13+0.1% HRS1620 | 1.5 | 97 | | 55 | 43 |
| (23) Item 14+0.1% HRS1620 | 1.5 | 96 | | 57 | 45 |
| (24) Item 15+0.1% HRS1620 | 1.5 | 95 | | 57 | 46 |
| (25) Item 16+0.1% HRS1620 | 1.5 | 95 | | 53 | 46 |
| (26) Item 17+0.1% HRS1620 | 1.5 | 97 | | 55 | 40 |
| (27) Item 18+0.1% HRS1620 | 1.5 | 98 | | 56 | 43 |

TABLE XXI

| Polypropylene Monofilament Samples (Woven into ½″ Wide Braids) | Titanium Dioxide, Percent | Percent Original Property Retained After Aging in an Atlas Weather-Ometer (Percent Toughness After Aging) | | | |
|---|---|---|---|---|---|
| | | 300 Hrs. | 600 Hrs. | 1,000 Hrs. | 1,500 Hrs. |
| (1) 1% DHBP+1% Poly TDP 2000-S | 1.5 | 85 | | 34 | 25 |
| (2) Item No. 1+0.5% HRS1620 | 1.5 | 91 | | 47 | 33 |
| (3) Item No. 1+0.5% DSPDP | 1.5 | 92 | | 48 | 32 |

Although the invention has been described in detail with reference to preferred embodiments thereof, it will be understood that variations and modifications can be effected within the spirit and scope of the invention as described hereinabove and as defined by the appended claims.

We claim:

1. A composition comprising (1) a hydrocarbon member selected from the group consisting of paraffin wax and a normally solid poly-α-olefin derived from an α-monoolefin having from 2 to 22 carbon atoms and (2) a linear thiodialkanoate glycol polyester of a molecular weight of from about 500 to about 4000, said polyester containing the repeating unit $$-O-\overset{O}{\underset{\|}{C}}-(CH_2)_y-S-(CH_2)_y-\overset{O}{\underset{\|}{C}}-O-R-$$

wherein y is 2 or 3 and R is selected from the group consisting of

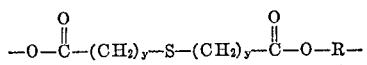

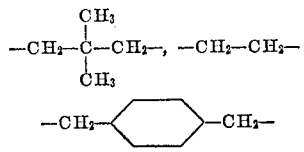

and —CH₂—CH₂—S—CH₂—CH₂—, said polyester being present in an amount of about 0.001% to about 10% by weight of the composition.

2. A composition according to claim 1 wherein at least one additional stabilizer is present at a weight ratio to said polyester of 1/20 to 20/1, said stabilizer being selected from the group consisting of alkylenedioxybis (alkylated phenols); polymeric phenols having the general formula

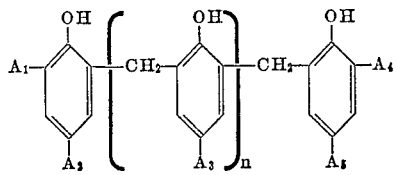

wherein $A_1$, $A_2$, $A_3$, $A_4$, and $A_5$ are alkyl radicals having 1–12 carbon atoms and $n$ is an integer of 1 to 4; phenyl salicylates; substituted phenyl salicylates; phenylamines; dialkyl pentaerythritol diphosphites; hydroxybenzophenones; butylated hydroxytoluene; trihydroxybutyrophenone; 4,4′-butylidenebis (6-t.-butyl-m-cresol); butylated hydroxyanisole; propyl gallate; 2,2′-methylenebis[6-(1-methylcyclohexyl-p-cresol)]; 2,2′-thiobis(6-t - butyl - p-cresol); 4,4′-thiobis (6-t-butyl-m-cresol); and 2-t-butyl-4-glycidyloxyphenol.

3. A composition according to claim 1 wherein y is 2 and R is

4. A composition according to claim 3 wherein said hydrocarbon member is said normally solid poly-α-olefin.

References Cited

UNITED STATES PATENTS

| | | | |
|---|---|---|---|
| 2,625,491 | 1/1953 | Young | 260—45.85 |
| 2,985,617 | 5/1961 | Salyer et al. | 260—45.75 |
| 3,033,814 | 5/1962 | Tholstrup | 260—45.85 |
| 3,038,878 | 6/1962 | Bell et al. | 260—45.85 |
| 3,039,993 | 6/1962 | Friedman | 260—45.8 |
| 3,072,603 | 1/1963 | Tholstrup | 260—45.85 |
| 3,072,604 | 11/1963 | Tholstrup | 260—45.85 |
| 3,255,136 | 6/1966 | Hecker et al. | 260—45.85 |
| 3,281,498 | 10/1966 | Watkins et al. | 260—75 |
| 2,985,617 | 5/1961 | Salyer et al. | 260—45.75 |
| 3,181,971 | 5/1965 | Rayner et al. | 260—45.9 |
| 3,255,136 | 6/1966 | Hecker et al. | 260—45.85 |

FOREIGN PATENTS

| | | |
|---|---|---|
| 577,252 | 7/1959 | Belgium. |
| 883,419 | 3/1943 | France. |
| 534,215 | 9/1931 | Germany. |
| 538,831 | 11/1931 | Germany. |
| 692,507 | 8/1964 | Canada. |

DONALD E. CZAJA, *Primary Examiner.*

L. J. BERCOVITZ, *Examiner.*

G. W. RAUCHFUSS, R. A. WHITE,
*Assistant Examiners.*

UNITED STATES PATENT OFFICE
CERTIFICATE OF CORRECTION

Patent No. 3,378,516          Dated April 16, 1968

Inventor(s)  Clarence E. Tholstrup et al.

It is certified that error appears in the above-identified patent and that said Letters Patent are hereby corrected as shown below:

In the heading to the printed specification, after line 6, insert -- Assignors to Eastman Kodak Company, Rochester, N. Y., a corporation of New Jersey --.

Signed and sealed this 21st day of November 1972.

(SEAL)
Attest:

EDWARD M. FLETCHER, JR.
Attesting Officer

ROBERT GOTTSCHALK
Commissioner of Patents